United States Patent
Schmitz

(10) Patent No.: US 12,541,553 B2
(45) Date of Patent: Feb. 3, 2026

(54) DIGITAL IMAGE HASH SEARCH TECHNIQUES

(71) Applicant: Adobe Inc., San Jose, CA (US)

(72) Inventor: Martin Schmitz, Hamburg (DE)

(73) Assignee: Adobe Inc., San Jose, CA (US)

( * ) Notice: Subject to any disclaimer, the term of this patent is extended or adjusted under 35 U.S.C. 154(b) by 239 days.

(21) Appl. No.: 18/303,043

(22) Filed: Apr. 19, 2023

(65) Prior Publication Data

US 2024/0354331 A1    Oct. 24, 2024

(51) Int. Cl.
*G06F 16/532*    (2019.01)
*G06F 16/538*    (2019.01)
*G06F 16/55*    (2019.01)
*G06F 16/587*    (2019.01)

(52) U.S. Cl.
CPC .......... *G06F 16/532* (2019.01); *G06F 16/538* (2019.01); *G06F 16/55* (2019.01); *G06F 16/587* (2019.01)

(58) Field of Classification Search
None
See application file for complete search history.

(56) References Cited

U.S. PATENT DOCUMENTS

| | | | |
|---|---|---|---|
| 7,801,893 B2 * | 9/2010 | Gulli' | G06F 16/951 707/758 |
| 8,892,542 B2 * | 11/2014 | Wang | G06F 16/5854 707/707 |
| 2012/0150837 A1 * | 6/2012 | Radlinski | G06F 16/951 707/E17.084 |
| 2014/0016872 A1 * | 1/2014 | Chao | G06F 16/50 382/218 |

OTHER PUBLICATIONS

Muja et al. "Scalable Nearest Neighbor Algorithms for High Dimensional Data" published Nov. 2014 by IEEE (Year: 2014).*
Farid, Hany , "Reining in Online Abuses", Technology & Innovation, The Conference, vol. 19 [retrieved Jan. 12, 2023]. Retrieved from the Internet <https://web.archive.org/web/20180721202148id_/http://www.cs.dartmouth.edu/farid/downloads/publications/nai18.pdf>., Feb. 9, 2018, 7 Pages.

* cited by examiner

*Primary Examiner* — Amresh Singh
(74) *Attorney, Agent, or Firm* — FIG. 1 Patents

(57) ABSTRACT

Digital image hash search techniques are described. These techniques leverage clusters formed from digital image hashes that overcome limitations and computational resource consumption of conventional clustering techniques used to implement a digital image search. In an example, search techniques employ two search stages. In a first stage, clusters are identified based on the cluster centers using a distance measure. The second stage involves a comparison of cluster hashes within the identified cluster with the search query hash until the distance measure is reached.

20 Claims, 9 Drawing Sheets

600

602
Generate a plurality of clusters from a plurality of digital image hashes

604
Calculate a plurality of distances from a respective digital image hash to a plurality of cluster centers of the plurality of clusters

606
Assign digital image hashes from the plurality of digital image hashes to respective clusters having respective distances that are within a radius of the respective clusters

608
Generate an additional cluster as part of the plurality of clusters for a digital image hash from the plurality of digital image hashes that is not within a plurality of radii of the plurality of clusters

610
Generate a search result based on a search query using the plurality of clusters

Fig. 6

DIGITAL IMAGE HASH SEARCH TECHNIQUES

BACKGROUND

The amount of digital images available from a variety of service provider systems is ever increasing. A service provider system, for instance, is configurable as a stock digital image service via which creative professionals make digital images available to potential consumers. Consequently, stock digital image services are tasked with maintaining millions of digital images, with thousands of new digital images received every day. A service provider system implementing a social network service, on the other hand, may receive millions of digital images per day as part of maintaining billions of digital images.

Consequently, search techniques used to locate digital images of interest are challenged by this ever increasing multitude of digital images. These challenges have a direct impact on a user's experience, computational resource consumption, and power consumption in maintaining digital images and supporting digital image search techniques.

SUMMARY

Digital image hash search techniques are described. These techniques leverage clusters formed from digital image hashes that overcome limitations and computational resource consumption of conventional clustering techniques used to implement a digital image search. In an example, search techniques employ two search stages. In a first stage, clusters are identified based on the cluster centers using a distance measure. The second stage involves a comparison of cluster hashes within the identified cluster with the search query hash until the distance measure is reached. As such, remaining members of the cluster that are further from this distance measure are not compared, thereby conserving computation resources and reducing power consumption.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 6 is a flow diagram depicting an algorithm as a step-by-step procedure in an example implementation of operations performable for accomplishing a result of cluster generation of digital images hashes generated from digital images.

DETAILED DESCRIPTION

Overview

Figure 1:
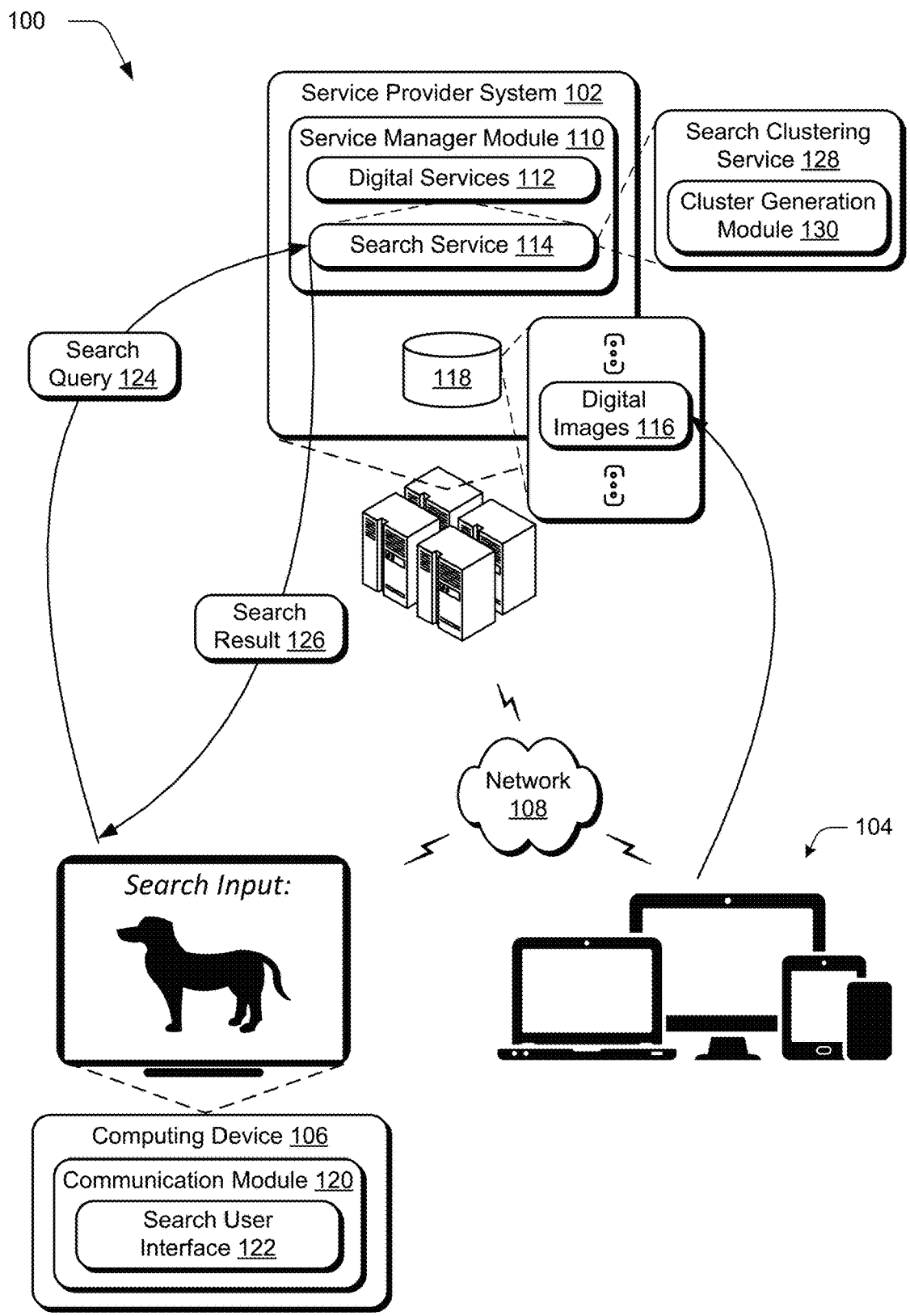
FIG. 1 is an illustration of a digital image search environment in an example implementation that is operable to employ clustering techniques that leverage digital image hashes as described herein.

Digital image search techniques are confronted with a technical challenge of locating digital images of interest from potential thousands of digital images maintained locally by a client device to potentially millions and even billions of digital images maintained by service provider systems, e.g., stock image systems, social media services, and so forth. Consequently, digital image search techniques in real world scenarios consume significant amounts of computational and power resources, the consumption of which continues to expand with the addition of thousands and even millions of digital images per day.

One technique that has been developed to address these challenges leverages digital image hashing. Digital image hashing is implemented by computing devices to generate a digital image hash that represents the content of a corresponding digital image. Examples of digital image hashing include perceptual hashing that is utilized to create similar digital image hashes for visually similar digital images. In another example, feature-based hashing involves extracting key features from a digital image (e.g., uniquely identifiable features such as corners, edges, and so on) as a basis to create a digital image hash as representative of content of the digital image. The digital image hashes are then used as a basis to implement a search technique, e.g., by comparing an input digital image hash generated from a search query to digital image hashes to locate a corresponding digital image that is visually similar.

Conventional digital image hash-based search techniques, however, are confronted with the use of ever increasing amounts of computational resources due to an amount of digital images hashes that are received every day. In a conventional linear search technique used to locate a digital image, a fourfold increase in use of computing resources is encountered for each doubling of an amount of digital image hashes maintained by a client device, service provider systems, and so forth. For example, in some conventional search techniques a digital image hash that is received as part of a search query is compared with each digital image hash maintained in a repository that is a subject of the search. Consequently, the operation of real-world devices is challenged by the continued increase of digital images maintained by these devices.

To address these technical challenges, digital image hash search techniques are described. These techniques leverage clusters formed from digital image hashes that overcome limitations and computational resource consumption of conventional clustering techniques used to implement a digital image search. These techniques are configured, for instance, to maximize search performance and may do so without satisfying other quality attributes, such as similar membership numbers in respective clusters.

In one or more examples, a plurality of digital image hashes are received by a search clustering service that are computed from respective input digital images. The digital image hashes are generated in a variety of ways, such as through perceptual hashing, feature-based hashing, and so forth as described above. Each of the digital image hashes are sequentially added to a set of clusters. To do so, a distance of the digital image hash is calculated to each cluster center of the clusters.

If the digital image hash is determined by the search clustering service as being within a radius of a respective cluster, the digital image hash is added to that cluster. In an implementation, the radius is defined as a distance from a center of the cluster that is used to define membership within that cluster, e.g., as a set distance used to form the clusters, based on a member of the cluster that is the furthest from the cluster center, and so forth. In an instance in which the digital image hash is within a radius of multiple clusters, the digital image hash is assigned by the search clustering service to a cluster that is the closest, i.e., a smallest amount of distance between the digital image hash and a corresponding cluster center. In an instance in which the digital image hash is not within any of the radii of the clusters, a new cluster is added by the search clustering service, and the digital image hash is set as the cluster center.

In an implementation, cluster hashes (i.e., digital image hashes of corresponding digital images that are being searched) are used to form an ordered listing within each of the clusters based on respective distances from a respective cluster center. The clusters, corresponding cluster centers, ordered listings, and the radii are then used as a basis by the search clustering service to perform a digital image search.

A search query, for instance, is received by the search clustering service that includes a search query hash generated from a digital image, i.e., is a digital image hash of a digital image that is to be used as a basis for a digital image search. Distances from the search query hash are then computed by the search clustering service to each of the cluster centers of the clusters.

The search clustering service then identifies one or clusters as corresponding to the search query hash (i.e., are a "match") based on the plurality of distances. To do so, a distance measure is used, which is based on the radius as described above as combined with a match distance threshold e.g., which may be empirically defined as further described below. Clusters that are identified as corresponding to the search query hash (e.g., having cluster centers within the distance measure) are included in a cluster list.

The search query hash is then compared by the search clustering service to cluster hashes within the identified clusters, i.e., that are members of clusters included in the cluster list. The search clustering service, for instance, obtains ordered listings of cluster hashes included in the respective clusters. A sequential (e.g., linear) search is then performed as following the ordered listing by comparing the search query hash to respective cluster hashes. The comparison, however, is terminated by the search clustering service once the distance measure is reached, e.g., a distance between the search query hash and corresponding cluster hash is greater than a combination of the radius and the match distance threshold. In this way, the search clustering service leverages insight that as soon as the distance measure is reached, each of the other cluster hashes that are members of the cluster are further away and therefore cannot be a match.

Thus, in the above example the search clustering service employs two search stages. In a first stage, clusters are identified based on the cluster centers, e.g., based on a distance measure. The second stage then involves a comparison of cluster hashes within the identified cluster with the search query hash until the distance measure is reached. As such, remaining members of the cluster that are further from this distance measure are not compared, thereby conserving computation resources and reducing power consumption.

In an implementation, the search clustering service is also configurable to optimize clustering parameters used to perform the clustering. Continuing with the above example, the radius is used to define how many clusters are formed as well as membership of cluster hashes within the clusters and centers of the clusters. Consequently, the search clustering service is also configurable to employ a cluster testing system to test candidate clustering parameters to address changes in amounts of digital images managed as part of a digital image search. The cluster testing system, for instance, is configurable to test a candidate cluster radius to generate candidate clusters based on digital image hashes as described above. Operation of the candidate clusters is then tested to determine if operational improvements are observed, e.g., a decrease in a number of computations. If so, the candidate clustering parameter is used as a cluster update to update operation of the search clustering service and thus may address changing conditions encountered by a search service, e.g., cause by continued addition of digital images that are managed by the search service. Other examples of candidate clustering parameters are also contemplated, such as a candidate cluster count, candidate match distance thresholds, and so on as further described in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital image hash search technique environment 100 in an example implementation that is operable to employ clustering techniques that leverage digital image hashes as described herein. The illustrated environment 100 includes a service provider system 102, a plurality of source devices 104, and a computing device 106 that are communicatively coupled, one to another, via a network 108. Computing devices that implement the service provider system 102, the plurality of source devices 104, and the computing device 106 are configurable in a variety of ways.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, although a single computing device is shown and described in some instances in the following discussion, a computing device is also representative of a plurality of different devices, such as multiple servers utilized by a business to perform operations "over the cloud" as described in FIG. 9.

The service provider system 102 includes a service manager module 110 that represents functionality usable to implement and manage operation of digital services 112. Digital services 112 are accessible remotely over the network 108 by the source devices 104 and computing device 106, e.g., using a network-enabled application, plug-in module, browser, and so forth. The service provider system 102, as implementing a network platform, implements the digital services 112 through execution of software by respective servers or other hardware devices.

Digital services 112 are configurable to support a wide variety of functionality, an example of which is a search service 114 that is configured to manage search functionality performed with respect to digital images 116, which are illustrated as stored in a storage device 118. The digital images 116, for instance, are received from the plurality of source devices 104, e.g., as part of a stock image service, a social network service, third-party repository "in the cloud," and so forth. The search service 114 is then configured to support a search of the digital images 116, e.g., whether uploaded by the entity itself (e.g., as part of a social network service), uploaded by other entities (e.g., by a stock image service), and so on.

A computing device 106, for instance, executes a communication module 120 that is representative of functionality to access the service provider system 102 via the network 108, e.g., as a browser, network-enabled application, plug-in module, and so forth. The communication module 120 supports output of a search user interface 122 to input a subject of a search, which is a digital image of a dog in the illustrated example. The input is used by the communication module 120 to form a search query 124 that is communicated to the search service 114 and used as a basis to form a search result 126 including representations of digital images corresponding to the search query 124, e.g., that are visually similar.

A search clustering service 128 is illustrated as representative of functionality in support of the search service 114 as implementing a digital image search. To do so, the search clustering service 128 is configured to leverage digital image hashes formed from the digital images 116 to represent content included within the digital images 116, e.g., "what is depicted" in the digital images 116. Examples of digital image hashing include perceptual hashing that is utilized to create similar digital image hashes for visually similar digital images. In another example, feature-based hashing involves extracting key features from a digital image (e.g., uniquely identifiable features such as corners, edges, and so on) as a basis to create a digital image hash as representative of content of the digital image.

A digital image hash, for instance, is configurable as a sequence of one-hundred and forty four bytes, which together represent a scaled down, normalized, and average grayscale gradient value from a region or block of a respective digital image 116. Digital image hashes are configurable to represent the content as being robust against image transformations (e.g., resolution changes, resizing, color adjustments, format transcoding, stretching, and so forth) to act as a "digital fingerprint" of content that is visually represented in the digital images 116.

Consequently, a comparison of distances between different digital image hashes is usable to define an amount of visual similarity of content included within corresponding digital images. A distance between two digital image hashes, for instance, is calculable as a sum of squares of a difference between two corresponding values, which are interpretable as numbers between "0" and "255," such as:

$$D = (a_1 - b_1)^2 + (a_2 - b_2)^2 + ...$$

A result of this expression is colloquially referenced as a Euclidean distance, although a Euclidean distance is defined as a square root value. The Pythagorean theorem refers to Euclidean distance as "$d^2=a^2+b^2+c^2$," in "$R^3$."

In the above example, the digital image hash is represented using "144" dimensions and as such, the digital image hash defines a point in "R144," i.e., a vector from an origin to a point with one hundred and forty four coordinates. The distance between two points in this vector space, therefore, is calculable as a length of a vector from one point to the other (i.e., the distance between the two points), which is expressed as a vector of each difference between each coordinate of the vectors:

$$V_d = V_a - V_b, V_{di,} = V_{ai} - V_{bi}, i \in [0 ... 143]$$

In order to determine a match, the search clustering service 128, as part of the search service 114, utilizes a match distance threshold. In this example, the match distance threshold is set as a difference "D" of "D=41943" such that a distance "d" is set as "d=sqrt (D)≈204." Accordingly, when comparing a digital image hash of the search query 124 with digital images hashes of the digital images 116, a "match" is reported that the corresponding digital images have at least a threshold amount of visual similarity when a distance "d" is below "≈204," i.e., the difference "D" between the vectors is below "≈41,943."

In order to perform this calculation, conventionally, a multiplication operation (or memory access operation) is involved by a computing device for each of the dimensions (e.g., "144") with "144" additional operations to compute a distance. These operations consume a central processing unit (CPU) cycle each, and therefore a 3 GHz CPU is able to compute "3·10⁹/288" distances per second, which is over ten million distances per second with additional overhead.

As previously described, service provider systems are challenged by ever increasing numbers of digital images 116 being uploaded by source devices 104. In one real-world scenario, a number of digital image hashes utilized by a service provider system increased from "275,000" to over four million in three years, which another ten-fold increase expected. Consequently, search techniques that rely on a comparison of each digital image hash received as part of a search query with digital image hashes maintained by the systems have increased complexity in both performing search operations as well as maintaining the digital image hashes in memory. This increase, therefore, involves a corresponding increase in computational resource consumption, as search complexity increases more than linearly with respect to a number of digital image hashes maintained by the system.

The search clustering service 128 is configured to leverage a cluster generation module 130 to generate clusters of digital image hashes. The clusters are then used by the search clustering service 128 to reduce operational complexity as well as a number of operations performed by the search service 114 in order to generate a search result 126 based on a digital image hash received as part of a search query 124.

As part of performing the search, the search clustering service 128 employs two search stages. In a first stage, clusters are identified by locating cluster centers of clusters that are within a distance measure of a hash of a digital image included in a search query 124, i.e., a search query hash. In a second stage, the search clustering service 128 compares a distance of the search query hash to individual digital image hashes of digital images included in a respective cluster, referred to as cluster hashes. This comparison is performed until the distance measure is reached. As such, remaining members (i.e., cluster hashes) of the cluster that are further from this distance threshold are not compared, thereby conserving computation resources and reducing power consumption. In operation, these techniques have exhibited performance improvements involving a savings of ~66-72% in computational time, thereby improving computing device performance and reducing power consumption. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Digital Image Hash Search Techniques

The following discussion describes digital image hash search techniques that are implementable utilizing the described systems and devices. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm.

Figure 2:
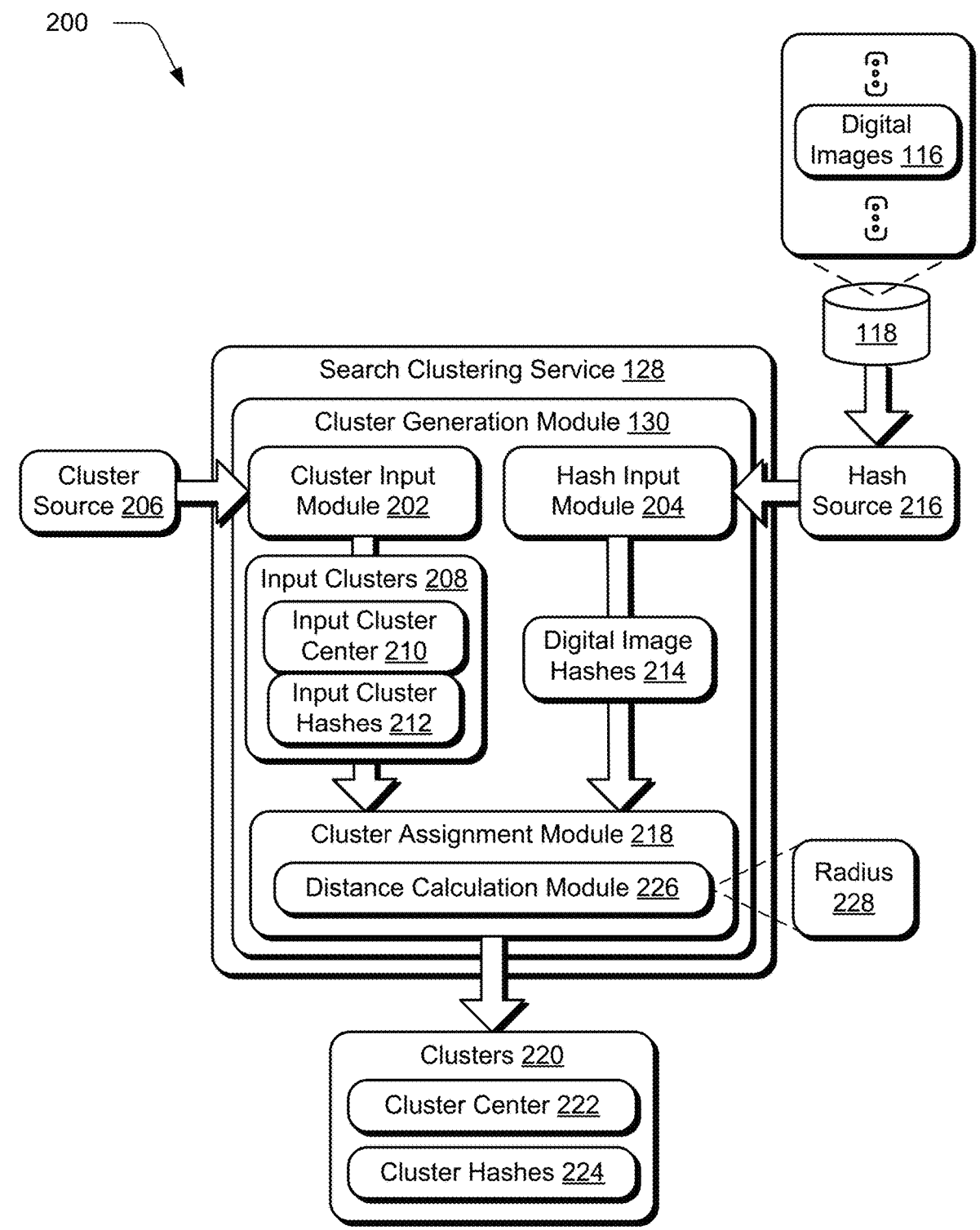
FIG. 2 depicts a system in an example implementation showing operation of a cluster generation module of FIG. 1 in greater detail as generating clusters, the clusters having cluster centers and cluster hashes.

FIG. 2 depicts a system 200 in an example implementation showing operation of a cluster generation module of FIG. 1 in greater detail as generating clusters having cluster centers and cluster hashes. FIG. 6 is a flow diagram depicting an algorithm as a step-by-step procedure 600 in an example implementation of operations performable for accomplishing a result of cluster generation of digital images hashes generated from digital images.

The cluster generation module 130 in the illustrated implementation includes a cluster input module 202 and a hash input module 204. The cluster input module 202 is configured to access a cluster source 206 to obtain input clusters 208 having an input cluster center 210 and input cluster hashes 212. The input clusters 208 in this example act to "prime" operation of the cluster generation module as part of cluster generation. The input clusters 208 are obtainable from a variety of sources, examples of which include use of clusters implemented by search services for image search that are obtained utilizing other techniques such as k-means clustering, and so forth. Other examples are also contemplated in which clusters are formed "from scratch" without use of predefined clusters.

The hash input module 204 is configured to obtain a plurality of digital image hashes 214 from a hash source 216. The digital images 116, for instance, are maintained in a storage device 118 by a service provider system 102 is support of digital services such as a stock image service, social media service, or any other digital image service that leverages digital image search. In one example, the digital images hashes 214 are formed for digital images to be added for use as part of a search service 114. In another example, the plurality of digital image hashes 214 are used as part of initial formation of the clusters.

A cluster assignment module 218 is utilized by the cluster generation module 130 to generate a plurality of clusters 220 from the digital image hashes 214 (block 602). The digital image hashes 214, for instance, are received as a list of "N" hashes, with each digital image hash represented as "h[i]," in which "$0 \leq i \leq N$." The clusters 220, once generated, are each assigned a cluster center 222 and cluster hashes 224 as digital image hashes of digital images that are members of that cluster.

To do so, a distance calculation module 226 is employed to calculate a plurality of distances from a respective digital image hash 214 to a plurality of cluster centers of the plurality of clusters (block 604), i.e., the input cluster centers 210 of the input clusters 208. A "Euclidean distance," for instance, is calculated by the distance calculation module 226 in a vector space defined by the digital image hashes.

The cluster assignment module 218 then assigns digital image hashes from the plurality of digital image hashes 214 to respective clusters having respective distances that are within a radius 228 of a respective cluster (block 606). The radius 228 defines a distance from a respective input cluster center 210 to an outer circumference that controls membership of input cluster hashes 212 within the cluster.

The radius, for instance, may be specified as a set value for each of the plurality of clusters (e.g., as a same value), may be based on a furthest input cluster hash 212 within a respective input cluster 208 from an input cluster center 210 of the input cluster 208, and so forth. Accordingly, the cluster assignment module 218 is configured to assign the digital image hash 214 to a respective cluster, to which, the digital image hash 214 is within a respective radius 228. In a scenario in which the digital image hash 214 is within a radius 228 of two or more clusters, the digital image hash 214 is assigned to a closest, i.e., has a shortest distance as computed by the distance calculation module 226.

The cluster assignment module 218 is also configured to generate an additional cluster as part of the plurality of clusters for a digital image hash from the plurality of digital image hashes 214 that is not within a plurality of radii of the plurality of clusters (block 608). In other words, this digital image hash is not within a radius of a cluster that is currently included as part of the plurality of clusters. In response, the cluster assignment module 218 generates an additional cluster and sets the digital image hash as a cluster center of the additional cluster.

Once each of the digital image hashes 214 in the list of "N" hashes is assigned to a corresponding cluster, the clusters 220 including the cluster centers 222 and cluster hashes 224 that are members of the clusters are used to generate a search result based on a search query (block 610). An example of generating a search query is included in the following discussion.

Figure 3:
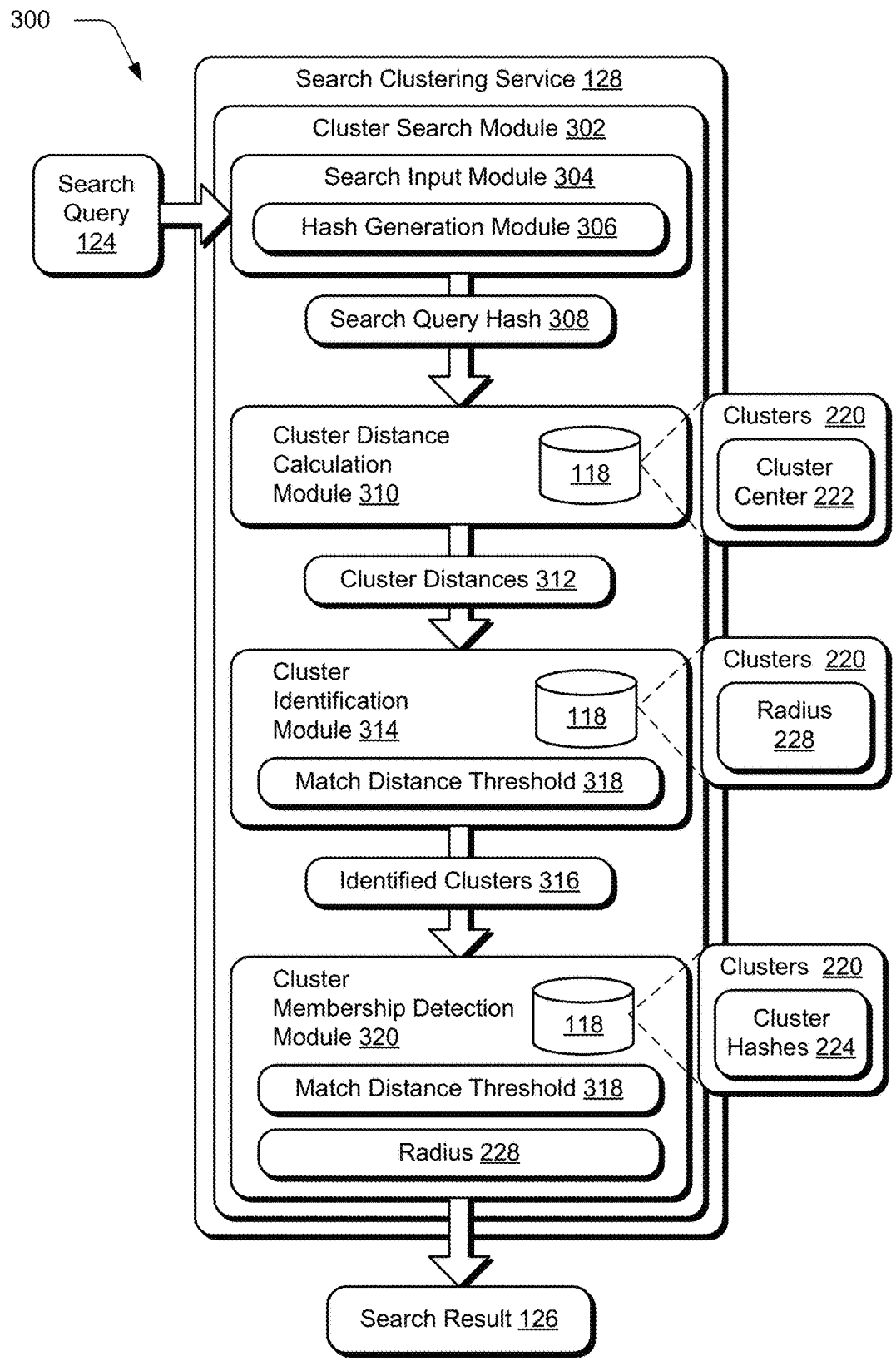
FIG. 3 depicts a system in an example implementation showing operation of a search clustering service of FIG. 1 in greater detail as employing clusters generated as shown in FIG. 2 as part of a digital image search.
Figure 7:
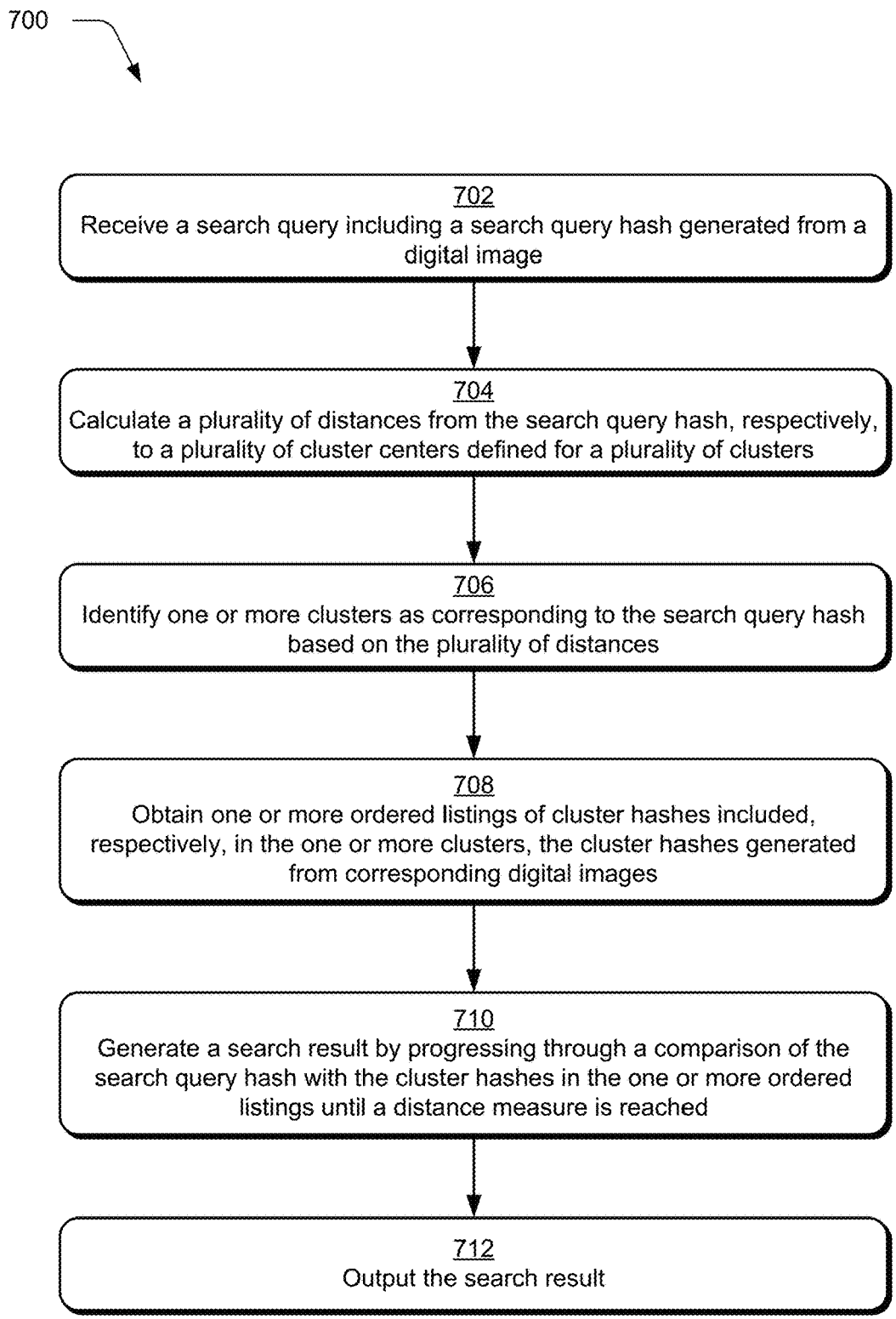
FIG. 7 is a flow diagram depicting an algorithm as a step-by-step procedure in an example implementation of operations performable for accomplishing a result of generating a search result leverage clusters formed of digital image hashes from digital images.

FIG. 3 depicts a system 300 in an example implementation showing operation of a search clustering service 128 of FIG. 1 in greater detail as employing clusters generated as shown in FIG. 2 as part of a search. FIG. 7 is a flow diagram depicting an algorithm as a step-by-step procedure 700 in an example implementation of operations performable for accomplishing a result of generating a search result leverage clusters formed of digital image hashes from digital images.

In this example, a cluster search module 302 is configured to implement a digital image search using the clusters 220, cluster center 222, cluster hashes 224, and radius 228 of FIG. 2. To do so, a search input module 304 receives a search query 124. The search query 124 includes a search query hash generated from a digital image (block 702). The search input module 304 utilizes a hash generation module 306 to generate a search query hash 308 from a digital image included in the search query 124. Examples of functionality usable to do so include perception-based hashing techniques, feature-based hashing techniques, and so on. In another instance, the search query 124 includes the search query hash 308 (e.g., as generated by a computing device 106) in order to conserve network and memory bandwidth.

The search query hash 308 is then communicated as an input to a cluster distance calculation module 310. The cluster distance calculation module 310 is representative of functionality to calculate a plurality of distances (e.g., cluster distances 312) from the search query hash 308, respectively, to a plurality of cluster centers 222 defined for a plurality of clusters 220 (block 704). The cluster distances 312, for instance, are calculated in a vector space defined by the search query hash 308 and cluster center 222, e.g., using Euclidean distances.

The cluster distances are then output to a cluster identification module 314. The cluster identification module 314 is configured to identify one or more clusters 220 as corresponding to the search query hash 308 based on the plurality of distances (block 706), i.e., the cluster distances 312. As part of this identification, the cluster identification module 314 employs a radius 228 and a match distance threshold 318 as basis of a distance measure.

The radius 228, as described above, defines membership of cluster hashes 224 within a respective cluster. For example, cluster hashes 224 that are within the radius 228 are included as members within a respective cluster 220 as described in relation to FIG. 2. The match distance threshold 318 is empirically defined (e.g., determined using testing as described in relation to FIGS. 4 and 8), set based on a user input, and so on. The match distance threshold 318 and the radius 228 define a basis for a distance measure usable to control which hashes are to be compared as part of a search process.

At this first stage of the search, the distance measure (e.g., a combination of the match distance threshold 318 and the radius 228) is used to identify which cluster are candidates for including cluster hashes that are a match to the search query hash 308, e.g., identified clusters 316 having a threshold amount of visual similarity as defined by the match distance threshold 318. Accordingly, clusters 220 that are not within the distance measure are not considered (i.e., compared), including cluster hashes 224 included within the clusters 220. As a result, computational resources and processing time are reduced by forgoing these additional comparison operations by identifying which clusters are candidates for including matching cluster hashes and which are not.

The identified clusters 316 are then passed as an input to a cluster membership detection module 320. The cluster membership detection module 320 is configured to detect which cluster hashes 224 that are members of the identified clusters 316 are a match as a basis to form the search result 126. Accordingly, the cluster identification module 314 is configured to generate the search result 126 by progressing through a comparison of the search query hash 308 with the cluster hashes 224 in the one or more ordered listings until a distance measure is reached (block 710).

To do so, the cluster membership detection module 320 obtains one or more ordered listings of cluster hashes 224 included, respectively, in the one or more clusters included in the identified clusters 316. The cluster hashes are generated from corresponding digital images (block 708) as previously described. The cluster hashes 224 are formed as ordered listings based on distances within a corresponding cluster 220 from a cluster center 222 of the cluster.

The search query hash 308 is then compared sequentially (e.g., linearly) through the ordered listings. Matches that are detected are stored in another list, as sorted by an original index of the hashes in the list. The cluster hashes 224, i.e., the "members" of the clusters 220, are sorted in the ordered listings by a respective distance from the cluster center 222.

Accordingly, the cluster membership detection module 320 is configured to cease (i.e., terminate) comparison of the search query hash 308 with the cluster hashes 224 upon reaching the distance measure, e.g., a combination of the match distance threshold 318 and the radius 228. This is because each of the remaining members of a respective cluster are further away and thus are not eligible as a match. In this way, comparison or remaining members (i.e., cluster hashes 224) of the identified clusters 316 is avoided, thereby conserving computation resources and improving processing times. The list of matching cluster hashes 224 is ordered (e.g., ranked) based on visual similarity and used to generate a search result 126, which is then output (block 712). The search result 126, for instance, is configurable to include representations (e.g., thumbnails) of corresponding digital images. A variety of other examples are also contemplated.

Figure 4:
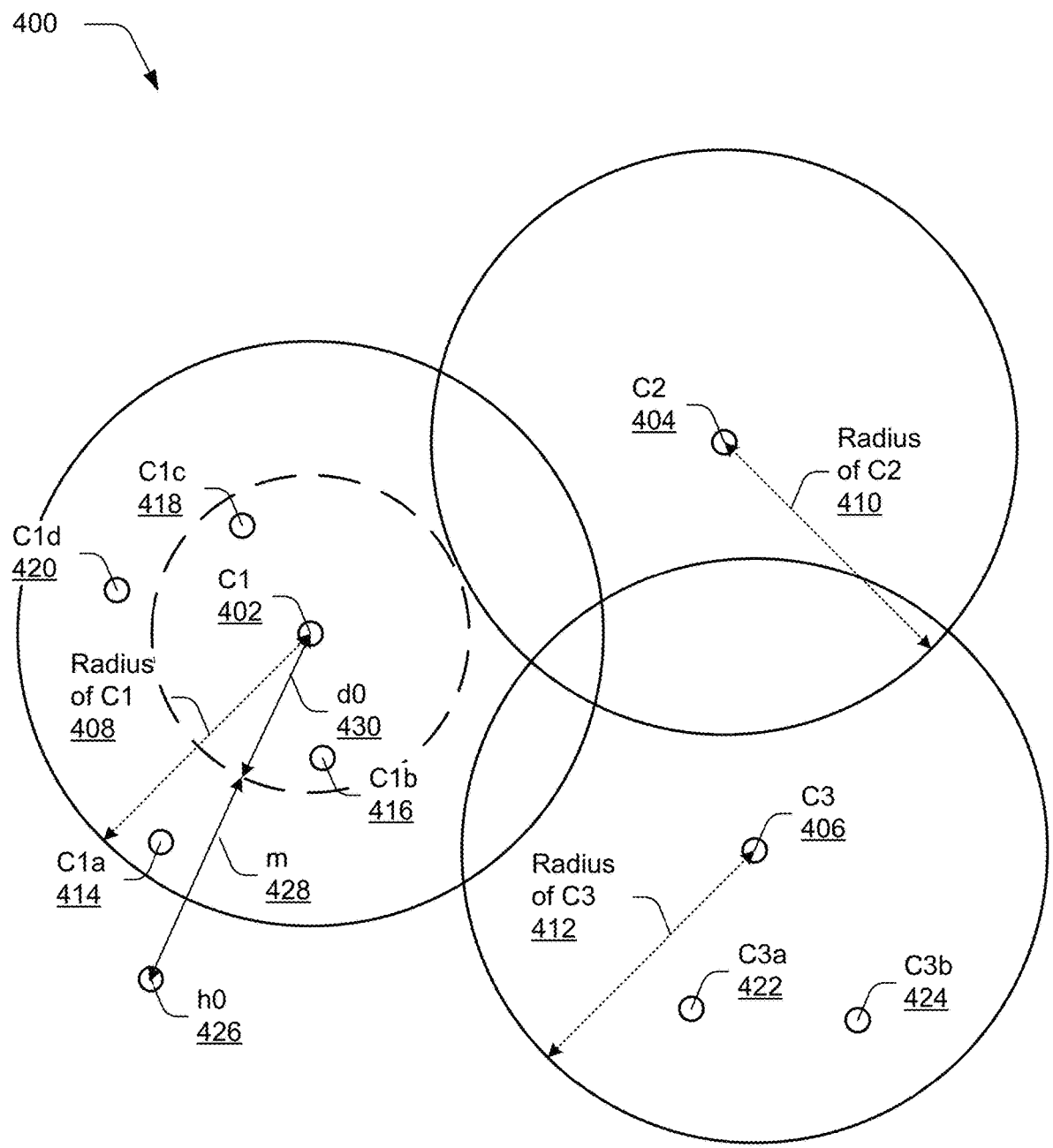
FIG. 4 depicts an example of clusters, radii, and cluster membership based on the radii as implementing a search.

FIG. 4 depicts an example 400 of clusters, radii, and cluster membership based on the radii as implementing a search. In the illustrated example, "C1" 402, "C2" 404, and "C3" 406 depict clusters as well as cluster centers of those clusters. Each of the clusters also includes a corresponding radius, which may be the same or different from one another, examples of which include "radius of C1" 408, "radius of C2" 410, and "radius of C3" 412. Cluster hashes "C1a" 414, "C1b" 416, "C1c" 418, and "C1d" 420 are members of cluster "C1" 402 as being disposed within radius of "C1" 408. Likewise, cluster hashes "C3a" 422 and "C3b" 424 are members of cluster "C3" 406 as being disposed within radius of "C3" 412.

An example of a search query hash 308 is depicted as "h0" 426 and a corresponding match distance threshold 318 is illustrated as "m" 428. A match is found between "h0" 426 and "C1a" 414 as being within the match distance threshold 318 of "m" 428. The hashes "C1b" 416 and "C1c" 418 cannot match "h0" 426 as being too close to "C1" 402 (e.g., within "d0" 430, which define a distance interval between "h0" 426 and "C1" 402 that is greater than "m" 428), no matter what direction from "C1" 402. On the other hand, "C1d" 420 is far enough from "C1" 402 as a candidate for a match with "h0" 426 and is compared but is not a match. No member of "C2" 404 or "C3" 406 is a candidate for a match with "h0" 426 as being further from "h0" 426 by the distance measure, e.g., radius plus the match distance threshold. Therefore, these clusters are not examined.

Figure 5:
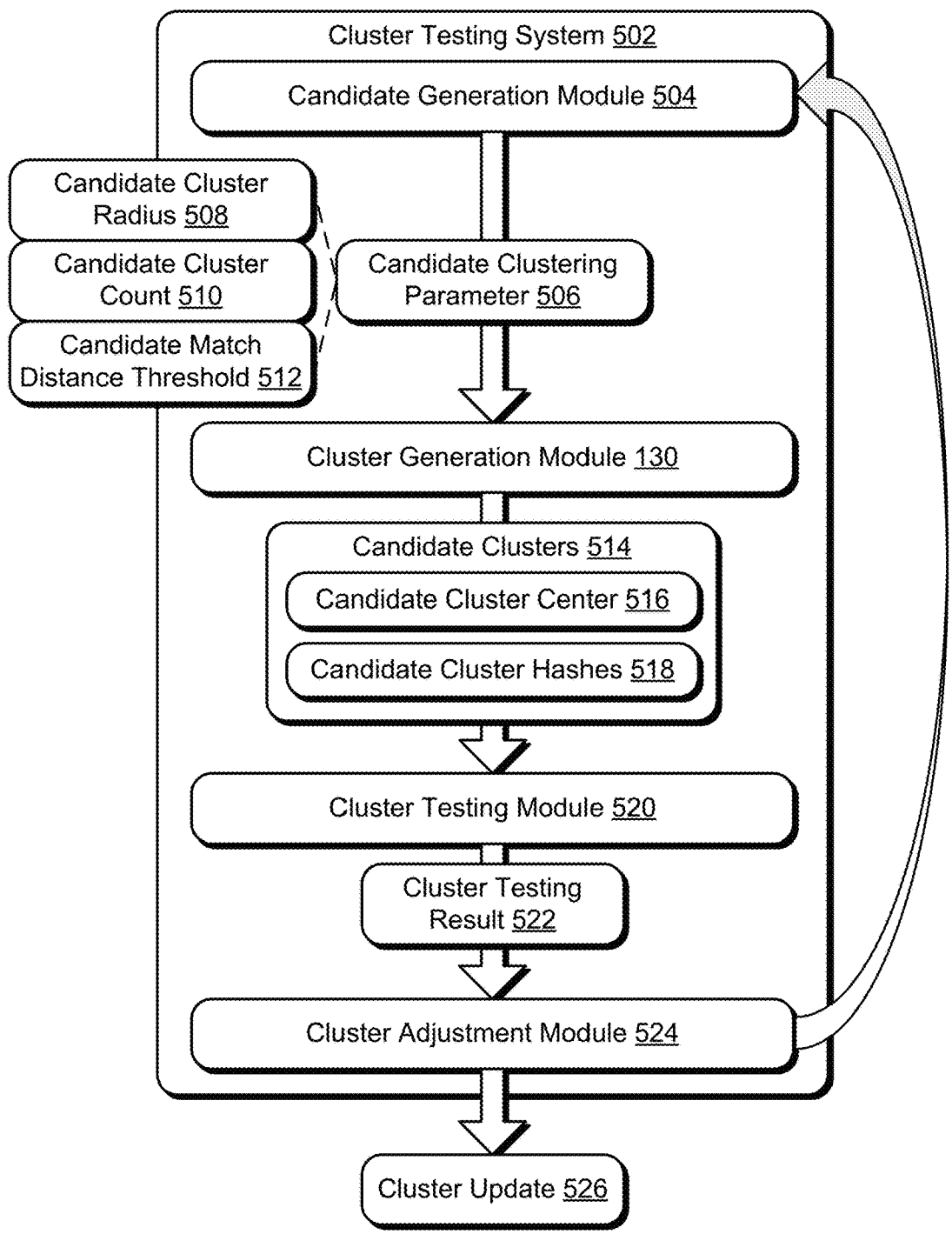
FIG. 5 depicts a system in an example implementation showing operation of a cluster testing system configured to test cluster parameters to address changes in operation of search services as caused by changes in an amount of digital images being searched.
Figure 8:
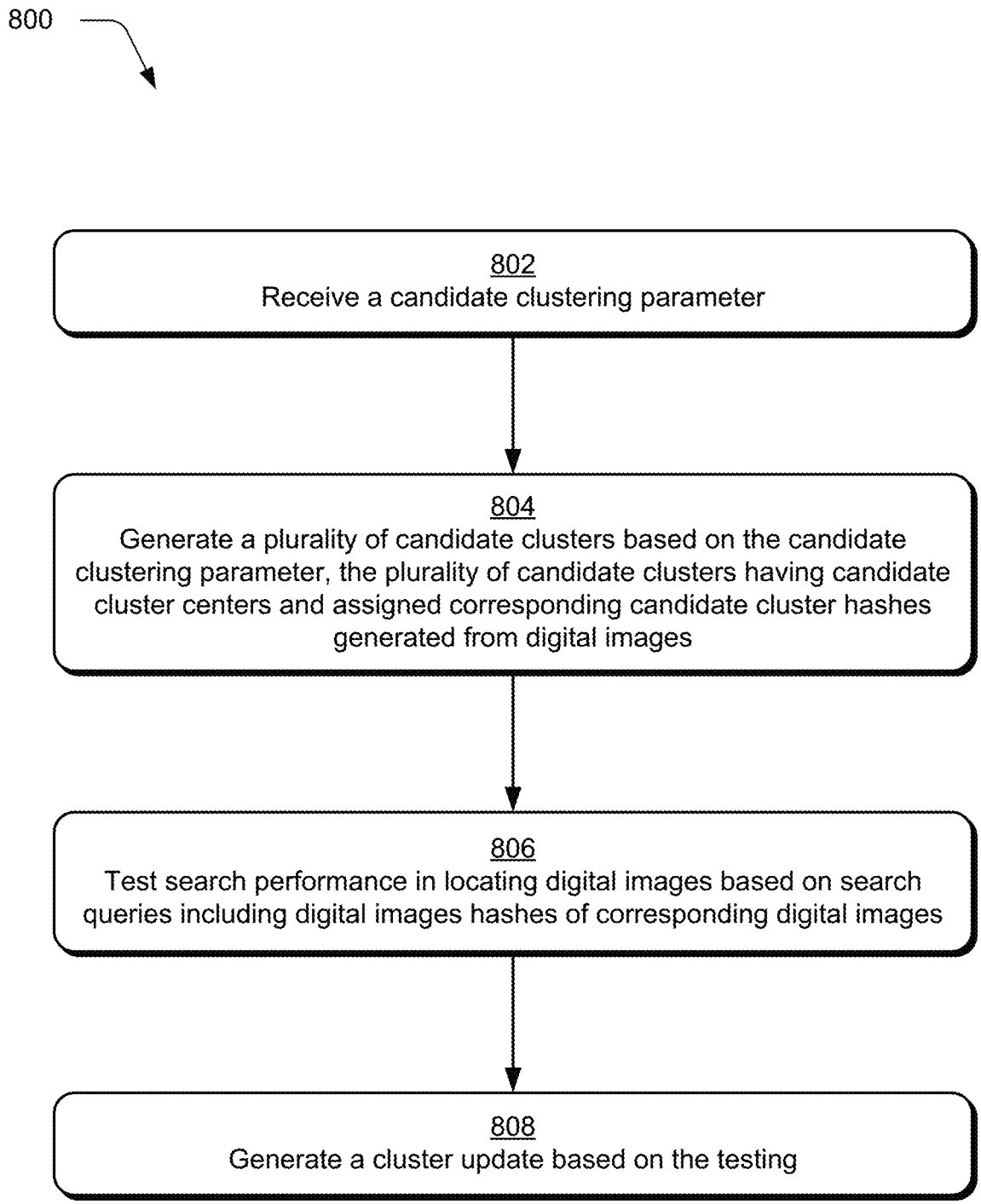
FIG. 8 is a flow diagram depicting an algorithm as a step-by-step procedure in an example implementation of operations performable for accomplishing a result of generating a cluster update by a cluster testing system of FIG. 5.

FIG. 5 depicts a system 500 in an example implementation showing operation of a cluster testing system configured to test cluster parameters to address changes in operation of search services as caused by changes in an amount of digital images being searched. FIG. 8 is a flow diagram depicting an algorithm as a step-by-step procedure 800 in an example implementation of operations performable for accomplishing a result of generating a cluster update by a cluster testing system of FIG. 5.

In the previous example, cluster generation and cluster membership are based on a variety of cluster parameters. Accordingly, in this example a cluster testing system 502 is implemented to test cluster parameters to optimize cluster formation and corresponding search performance.

To do so, a cluster testing system 502 includes a candidate generation module 504 that is configured to generate one or more candidate clustering parameters 506 for testing. Examples of candidate clustering parameters include a candidate cluster radius 508, a candidate cluster count 510, a candidate match distance threshold 512, and so forth. The candidate cluster radius 508, for instance, is usable to change a radius used to define cluster membership. The candidate cluster count 510 is usable to set a number of clusters to be generated. The candidate match distance threshold 512 defines a distance, within which, two digital images are considered a match. A variety of other examples of candidate clustering parameter 506 are also contemplated.

A cluster generation module 130 receives a candidate clustering parameter (block 802), e.g., which parameters are changes from previous parameters used to define the clusters by the cluster generation module 130. A plurality of candidate clusters 514 are generated (block 804) as having candidate cluster centers using a variety of techniques, examples of which include the techniques described in relation to FIG. 2 which include candidate cluster centers 516 and candidate cluster hashes 518.

A cluster testing module 520 is then employed to test search performance in locating digital images based on search queries including digital images hashes of corresponding digital images (block 806). The cluster testing module 520, for instance, tests a number of operations performed as part of a digital image search, an amount of time taken, and so forth for a set of test search queries. In response, a cluster testing result 522 is output and used as a basis by a cluster adjustment module 524 to generate a cluster update 526 based on the testing (block 808).

The cluster testing result 522, for instance, may indicate that a change to a candidate cluster radius 508 and/or a candidate cluster count 510 results in a performance improvement. Selection of the radius is used to decide how many clusters are formed and how many members each cluster has on average, and is empirically selected to minimize each of the distance computations involved. In response, the cluster adjustment module 524 generates a cluster update 526 to cause the cluster generation module 130 to implement the change, thereby improving operation of the cluster search module 302 using those clusters. A variety of other examples are also contemplated, such as to change the candidate match distance threshold 512 to adjust an amount of visual similarity in digital images that is considered a match, e.g., due to increasing numbers of digital images additional visual similarity may be desired.

Example System and Device

Figure 9:
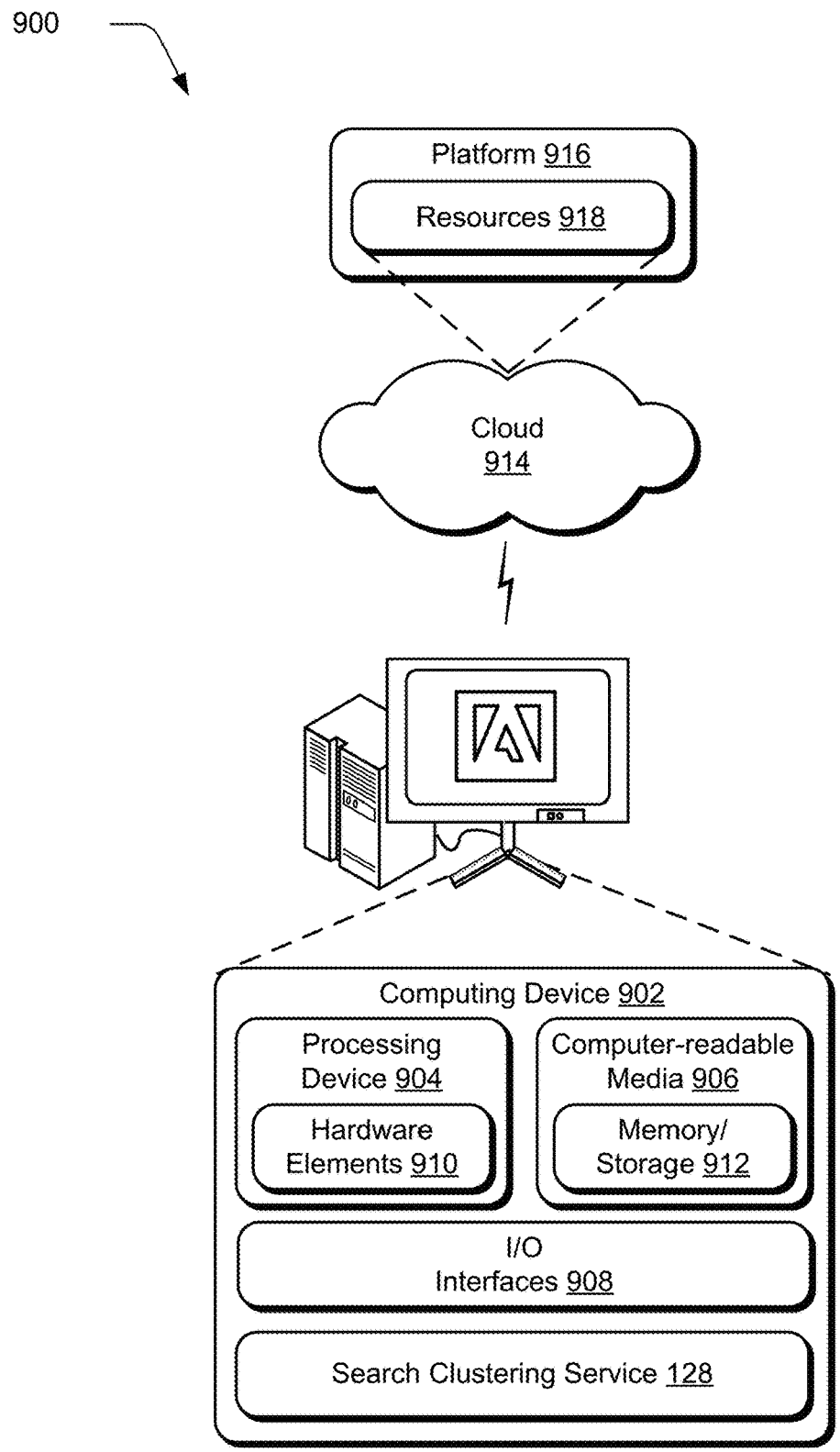
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that implement the various techniques described herein. This is illustrated through inclusion of the search clustering service 128. The computing device 902 is configurable, for example, as a server of a service provider, a device associated with a client (e.g., a client device), an on-chip system, and/or any other suitable computing device or computing system.

The example computing device 902 as illustrated includes a processing device 904, one or more computer-readable media 906, and one or more I/O interface 908 that are communicatively coupled, one to another. Although not shown, the computing device 902 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 904 is representative of functionality to perform one or more operations using hardware. Accordingly, the processing device 904 is illustrated as including hardware element 910 that is configurable as processors, functional blocks, and so forth. This includes implementation in hardware as an application specific integrated circuit or other logic device formed using one or more semiconductors. The hardware elements 910 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 906 is illustrated as including memory/storage 912 that stores instructions that are executable to cause the processing device 904 to perform operations. The memory/storage 912 represents memory/storage capacity associated with one or more computer-readable media. The memory/storage 912 includes volatile media (such as random access memory (RAM)) and/or nonvolatile media (such as read only memory (ROM), Flash memory, optical disks, magnetic disks, and so forth). The memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 902. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 910. The computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing device 904. The instructions and/or functions are executable/operable by one or more articles of manufacture (for example, one or more computing devices 902 and/or processing devices 904) to implement techniques, modules, and examples described herein.

The techniques described herein are supported by various configurations of the computing device 902 and are not limited to the specific examples of the techniques described herein. This functionality is also implementable all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 include applications and/or data that can be utilized while computer processing is executed on servers that are remote from the computing device 902. Resources 918 can also include services provided over the Internet and/or through a subscriber network, such as a cellular or Wi-Fi network.

The platform 916 abstracts resources and functions to connect the computing device 902 with other computing devices. The platform 916 also serves to abstract scaling of resources to provide a corresponding level of scale to encountered demand for the resources 918 that are implemented via the platform 916. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

In implementations, the platform 916 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving, by a processing device, a candidate clustering parameter;
generating, by the processing device, a plurality of candidate clusters based on the candidate clustering parameter, the plurality of candidate clusters having candidate cluster centers and assigned corresponding candidate cluster hashes generated from digital images;
testing, by the processing device, search performance of the plurality of candidate clusters in locating digital images based on a search query, the testing including:
calculating a plurality of distances from a search query hash of the search query, respectively, to a plurality of candidate cluster centers defined for the plurality of candidate clusters;
obtaining one or more ordered listings of cluster hashes included, respectively, in one or more said candidate clusters identified based on the plurality of distances; and
progressing through a comparison of the search query hash with the respective said candidate cluster hashes in the one or more ordered listings until a distance measure is reached;
determining, by the processing device, an operational improvement of operation of the plurality of candidate clusters based on the testing with respect to operation of one or more clusters of a search clustering service; and
generating, by the processing device, a cluster update configured to cause the search clustering service to implement the candidate clustering parameter, the generating based on the testing and responsive to the determining.

2. The method as described in claim 1, wherein the candidate clustering parameter defines a candidate cluster radius defining a radius from a respective candidate cluster center that defines membership in a respective said cluster by the corresponding candidate cluster hashes.

3. The method as described in claim 1, wherein the candidate clustering parameter is a candidate cluster count defining a number of clusters included in the plurality of candidate clusters.

4. The method as described in claim 1, wherein the candidate clustering parameter defines a match distance threshold that defines a distance used to define a match between the search queries and the corresponding candidate cluster hashes.

5. The method as described in claim 1, wherein the progressing through the comparison of the search query hash with the cluster hashes in the one or more ordered listings is performed such that the distance measure is reached and at least one cluster hash remaining in the one or more ordered listing past the distance measure is not compared with the search query hash.

6. The method as described in claim 1, further comprising generating a search result by progressing through a comparison of a search query hash with cluster hashes in one or more ordered listings obtained from a cluster until a distance measure is reached such that at least one cluster hash remaining in the one or more ordered listings past the distance measure is not compared with the search query hash.

7. A computing device comprising:
a processing device; and
a computer-readable storage medium storing instructions that, responsive to execution by the processing device, causes the processing device to perform operations including:
generating a plurality of candidate clusters based on a candidate clustering parameter as having candidate cluster centers and including candidate cluster hashes for corresponding digital images;
testing search performance of the plurality of candidate clusters in locating digital images based on search queries including digital images hashes of corresponding digital images;
forming a plurality of clusters based on a cluster update generated as a result of the testing;
receiving a search query hash generated from a digital image;
calculating a plurality of distances from the search query hash, respectively, to a plurality of cluster centers defined for the plurality of clusters;
identifying one or more clusters as corresponding to the search query hash based on the plurality of distances;
obtaining one or more ordered listings of cluster hashes included, respectively, in the one or more clusters, the cluster hashes generated from corresponding digital images, the cluster hashes included, respectively, in the one or more ordered listings as sorted based on respective distances from a cluster center of a corresponding said cluster;
generating a search result by progressing through a comparison of the search query hash with the cluster hashes in the one or more ordered listings until a distance measure is reached.

8. The computing device as described in claim 7, wherein the identifying includes comparing the plurality of distances using a match distance threshold and a cluster radius.

9. The computing device as described in claim 8, wherein the cluster radius is used to define membership of respective said cluster hashes in a respective said cluster.

10. The computing device as described in claim 7, wherein the one or more ordered listings include respective said cluster hashes ordered based on a distance from a respective said cluster center of a respective said cluster.

11. The computing device as described in claim 7, wherein the distance measure is based on a match distance threshold and a cluster radius.

12. The computing device as described in claim 7, wherein the progressing through the comparison of the search query hash with the cluster hashes in the one or more ordered listings is performed such that the distance measure is reached and at least one cluster hash remaining in the one or more ordered listing past the distance measure is not compared with the search query hash.

13. The computing device as described in claim 7, further comprising generating the plurality of clusters by assigning the cluster hashes based on a cluster radius.

14. One or more computer-readable storage media storing instructions that, responsive to execution by a processing device, causes the processing device to perform operations comprising:
- receiving a candidate clustering parameter;
- generating a plurality of candidate clusters based on the candidate clustering parameter, the plurality of candidate clusters having candidate cluster centers and assigned corresponding candidate cluster hashes generated from digital images;
- testing search performance of the plurality of candidate clusters in locating digital images based on a search query, the testing including:
  - calculating a plurality of distances from a search query hash of the search query, respectively, to a plurality of candidate cluster centers defined for the plurality of candidate clusters;
  - obtaining one or more ordered listings of cluster hashes included, respectively, in one or more said candidate clusters identified based on the plurality of distances; and
  - progressing through a comparison of the search query hash with the respective said candidate cluster hashes in the one or more ordered listings until a distance measure is reached;
- determining an operational improvement of operation of the plurality of candidate clusters based on the testing with respect to operation of one or more clusters of a search clustering service; and
- generating a cluster update configured to cause the search clustering service to implement the candidate clustering parameter, the generating based on the testing and responsive to the determining.

15. The one or more computer-readable storage media as described in claim 14, wherein the candidate clustering parameter defines a candidate cluster radius defining a radius from a respective candidate cluster center that defines membership in a respective said cluster by the corresponding candidate cluster hashes.

16. The one or more computer-readable storage media as described in claim 14, wherein the candidate clustering parameter is a candidate cluster count defining a number of clusters included in the plurality of candidate clusters.

17. The one or more computer-readable storage media as described in claim 14, wherein the candidate clustering parameter defines a match distance threshold that defines a distance used to define a match between the search queries and the corresponding candidate cluster hashes.

18. The one or more computer-readable storage media as described in claim 14, wherein the operations further comprise generating a search result by progressing through a comparison of a search query hash with cluster hashes in one or more ordered listings obtained from a cluster until a distance measure is reached such that at least one cluster hash remaining in the one or more ordered listings past the distance measure is not compared with the search query hash.

19. The one or more computer-readable storage media as described in claim 14, wherein the progressing through the comparison of the search query hash with the cluster hashes in the one or more ordered listings is performed such that the distance measure is reached and at least one cluster hash remaining in the one or more ordered listing past the distance measure is not compared with the search query hash.

20. The one or more computer-readable storage media as described in claim 14, wherein the distance measure is based on a match distance threshold and a cluster radius.

* * * * *